United States Patent Office 3,451,146
Patented June 24, 1969

3,451,146
MECHANICAL MOTION SYSTEM
Edward G. Pancoe, Chenango Forks, and Robert L. Smith, Binghamton, N.Y., assignors to Singer-General Precision, Inc., Binghamton, N.Y., a corporation of Delaware
Filed Dec. 9, 1966, Ser. No. 600,436
Int. Cl. G09b 9/08
U.S. Cl. 35—12
17 Claims

ABSTRACT OF THE DISCLOSURE

A motion system of the type commonly used to impart motion cues in vehicle simulators for training purposes. Apparatus is disclosed in which the student station is fixedly mounted on a carrier which is movable both laterally and rotationally in a novel manner with respect to a base which may in turn be mounted for movement in a number of degrees of freedom. In the disclosed embodiment, a total of five (two translational and three rotational) degrees of freedom may be independently achieved.

---

In many situations a platform which supports a comparatively heavy load (in the nature of several tons) must be moved smoothly and accurately in any or all of several different directions under the control of input signals. To avoid going into unnecessary elaboration by describing several of these situations, the movable platform of this invention will be described in relation to one such situation only; to provide cockpit motion in an aircraft simulator.

When simulating the motion of any movable body for training purposes, the amount of training desired often determines the number of degrees of freedom which must be simulated. Thus, for example, if an automobile is being simulated to train student drivers, little more than forward motion with some change of forward direction is required to be simulated. There is no need to provide for pitch, or roll, or vertical, or lateral movement because these degrees of freedom are neither often encountered nor necessary to train the student driver. On the other hand, when simulating the motion of a space capsule during all of its phases of flight, six degrees of freedom are required to provide the trainee with a complete experience of what he can expect during an actual mission. In each of these cases, a platform supporting the trainee must be provided with means to simulate the desired degrees of freedom with controlled accuracy of both direction and speed. There is little difficulty in providing such movable and controllable platforms for light loads, but when the loading becomes quite heavy, the difficulties encountered in providing a smoothly operating movable platform for simulating the motion of a vehicle become intensified and multiplied.

Prior machines which have provided motion for platforms of this nature have readily supplied two, or three, or four degrees of freedom so that yaw, or roll, or pitch could be simulated together with vertical or horizontal movement. In fact, one small general purpose flying skills trainer was mounted on a rotating shaft by means of a universal joint. A platform which rotated with the shaft then supported four motion controlling expansible motors which controlled the attitude of the cockpit. By controlling any two of the four expansible motors together, the cockpit could be made to roll, and pitch, and the rotatable shaft and platform produced yaw. Of course, this device was constructed for small loads and the entire unit could readily be supported at one point. Even so, the amount of roll and pitch was limited. Subsequent simulators have used moving platforms which could simulate some of the motions of vehicle operation, but they have usually been limited to four or fewer degrees of motion. The greater loads which are to be moved in modern equipment requires that the platform to which motion is to be imparted must be supported at several points. The larger the number of support points, the more difficult it is to achieve several degrees of freedom.

It is an object of this invention to provide a new and improved platform motion system.

It is another object of this invention to provide a new and improved platform motion system having several degrees of freedom.

It is a further object of this invention to provide a new and improved platform motion system having five degrees of freedom.

It is still another object of this invention to provide a new and improved platform motion system for moving heavy loads smoothly, effectively and accurately.

Other objects and advantages of this invention will become more apparent as the following description proceeds, which description should be considered together with the accompanying drawings in which.

Figure 1:
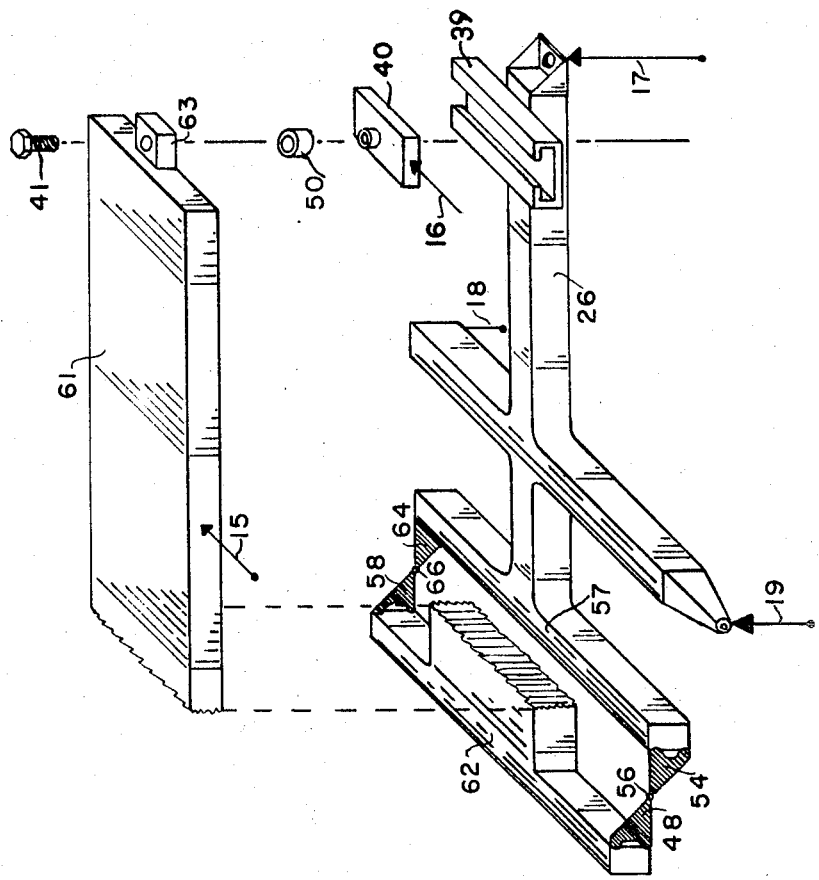
FIG. 1 is a broken perspective showing of a simplified motion system utilizing the principles of this invention.

Referring now to the drawings in detail, and more particularly to FIG. 1, the reference character 26 designates a beam which is supported on any suitable surface (not shown) at three points: at its rear end by a hydraulic cylinder represented by the arrow 17, at the right hand end of a cross member by a cylinder represented by an arrow 18, and at the left hand end of the cross member by a hydraulic cylinder represented by an arrow 19. FIG. 1 is a simple sketch which illustrates the relationships of the various parts of the system without necessarily showing the actual form or construction of those parts. In order to simplify the explanation of the system and its operation, some elements of the system are shown in FIG. 1 by representative symbols. To provide for free movement of the beam 26, each of the cylinders represented by the arrows 17, 18 and 19 is preferably connected to the beam 26 at one end and to the supporting structure at its other end by a universal type of connection. Any suitable bracket can be used to effect the connection such as that on the rear end of beam 26.

The beam 26 is capable of motion about three axes to produce pitch, roll and elevation. Assuming that the cylinders 18 and 19 are maintained inoperative, the beam 26 is caused to pitch about the ends of the cross member by the operation of the cylinder 17. If additional movement or speed of movement is desired in pitch, the cylinder 17 can be operated in one direction and the two amidships cylinders 18 and 19 can be operated simultaneously in the opposite direction. For roll, the cylinder 17 is maintained inoperative and one or the other (or even both if higher speed or greater movement is desired) of the two amidships cylinders 18 and 19 are operated. In roll, the beam 26 pivots about its longitudinal axis. When all three of the cylinders 17, 18 and 19 are operated in the same direction, at the same rate and by the same amounts, the beam 26 is moved vertically. Thus, when the supports and the apparatus shown schematically in FIG. 1, the beam 26 can be moved in controlled fashion in three degrees of freedom.

A carrier 61 is supported on the beam 26 at three points. A slide box 39 is attached to the aft end of the beam 26, and a slide 40 is movably carried therein. This portion of the equipment of FIG. 1 is shown in exploded positions. A bolt or pin 41 passes through a hole in a bracket 63 mounted on the back end of the carrier 61 and through a bearing 50 (which may be universally mounted) and the slide 40 to fasten the rear end of the carrier 61 movably to the rear end of the beam 26. The slide 40 is laterally movable in the slide box 39. At the forward end, the carrier 61 comprises a cross member 62 which is connected at its outer ends to the outer end of a cross member 57 on the beam 26 by a pair of scissors. The scissors on the left hand ends of the cross members 62 and 57 comprise members 48 and 54 connected together by a pivot 56. The right hand scissors comprises members 58 and 64 connected together by a pivot 66. The front end of the carrier 61 is supported on the two pivots 56 and 66, both of which are preferably universals.

As explained above, the beam 26 is supported at three points, and the carrier 61 is supported on the beam 26 at three points. This, in effect, amounts to supporting the carrier 61 on three points with the three support points of the carrier, themselves, being supported. With this arrangement, five degrees of freedom are achieved with five hydraulic cylinders or other motor means. Movement of the carrier 61 is accomplished by means of two hydraulic cylinders, a cylinder represented by the arrow 15 being connected to the side of the carrier 61 approximately amidships, and a cylinder represented by an arrow 16 connected to the slide 40. In operation, the carrier 61 can be moved to superimpose upon the motions achieved by the beam 26 the additional motions of yaw and lateral motion. If the cylinder 16 is maintained fixed, and the cylinder 15 is operated, then the carrier 61 will yaw about the pin 41. If both of the cylinders 15 and 16 are operated, but in opposite directions, then the carrier 61 will yaw about a point intermediate the two cylinders 15 and 16. If the two cylinders 15 and 16 are operated simultaneously, with the cylinder 16 moving but a small amount, the carrier 61 is caused to yaw about a point behind the aft end of the carrier. The location of the pivot point behind the rear of the carrier 61 is determined by the relative rates and amounts of movement of the two cylinders 15 and 16, until the point is moved out to infinity when the lateral movement provided by the two cylinders 15 and 16 is in the same amount and in the same direction. This is, then, lateral movement of the carrier 61. A platform mounted on the carrier 61 is then moved by controlled devices in any of five degrees of freedom: (a) pitch, (b) roll, (c) vertical, (d) yaw, and (e) lateral.

Figure 2:
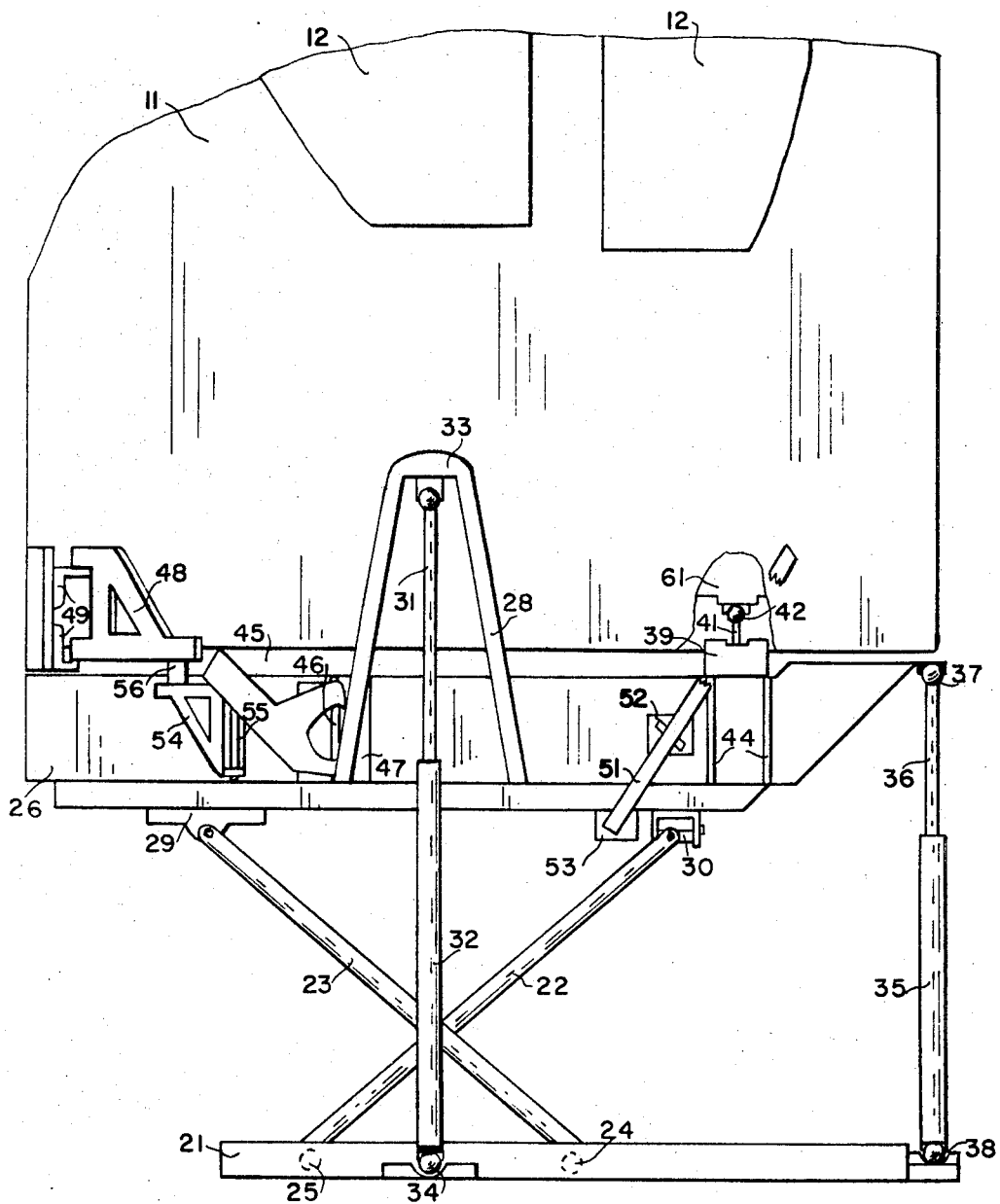
FIG. 2 is a generalized pictorial illustration of a motion system according to this invention.
Figure 4:
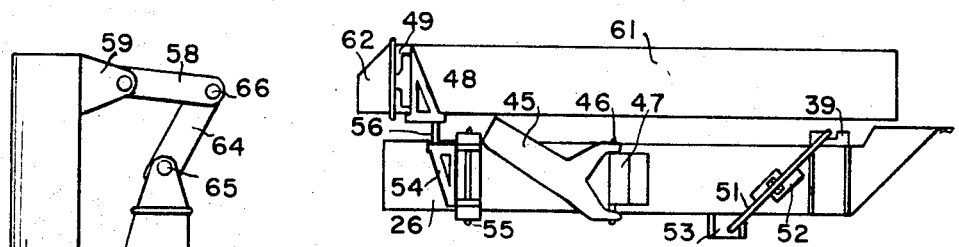
FIG. 4 is a side view of the apparatus of FIG. 3.
Figure 3:
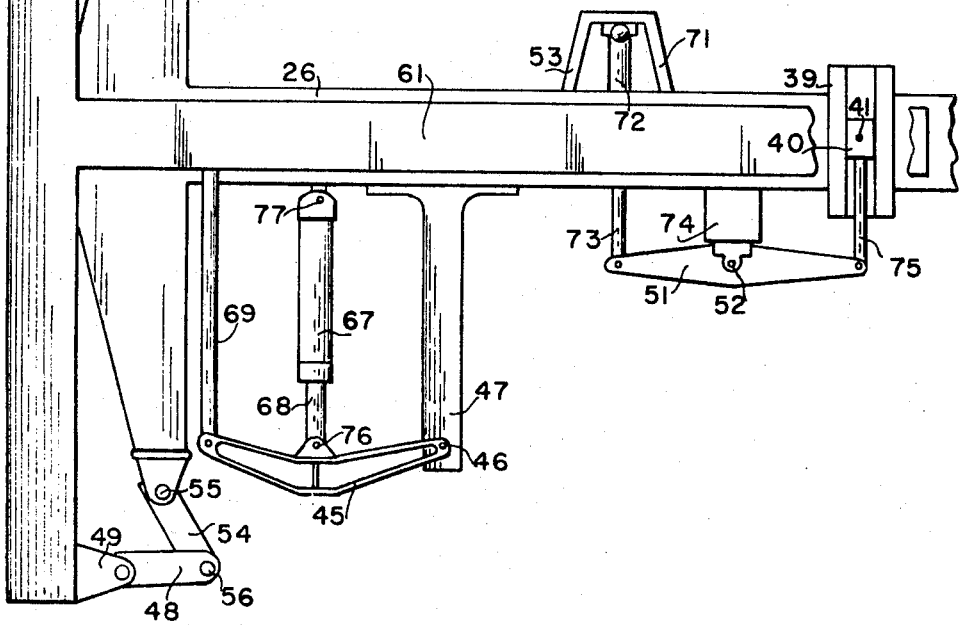
FIG. 3 is a plan view of the motion platforms and operating mechanism of the system of FIG. 2.

One form in which the motion of the simplified system of FIG. 1 can be accomplished is by the apparatus shown in FIGS. 2, 3 and 4. In these figures, the reference characters referring to elements which can be considered to be the same as those shown in FIG. 1 will be the same as those of FIG. 1. A vehicle body 11, such as the simulated cockpit of an airplane, has a pair of hatches or windows 12. A base 21, which may be readily attached to a floor or similar structure supports a pair of stabilizing crossed members 22 and 23. The member 23 is pivoted on an axis 24 in the base 21, and the member 22 is pivoted on an axis 25 in the base 21. The other end of the member 22 is attached to the beam 26 by means of a universal joint 30, and the other end of the beam 23 is attached to a slide 29 mounted on the underside of the forward end of the beam 26. Also mounted on the beam 26 is a frame 28 in the shape of an inverted U having its legs fastened to the beam 26 and a universal or ball joint 33 mounted in its arc. The U-frame 28 is used to accommodate long piston rods and cylinders for long vertical movement while still maintaining the center of gravity of the entire system as low as possible. A piston rod 31 has one end connected to the universal joint 33, and a piston on its other end is contained within a hydraulic cylinder 32. The other end of the hydraulic cylinder 32 is supported on a universal joint 34 mounted on the base 21. Another hydraulic cylinder 35 is mounted on a universal joint 38 at the stern end of the base 21 and contains a piston to which one end of a piston rod 36 is connected. The other end of the piston rod 36 is connected to a universal joint 37 mounted at the aft end of the beam 26. FIG. 2 is an elevational view of the vehicle body 11 and its support members and illustrates only one side of this device. A duplicate of the frame 28, the cylinder 32, the piston rod 31 and the supporting joints is mounted on the obscured side of the device as shown in FIG. 2. Thus, the beam 26 is supported at three points: at the rear by cylinder 35 and piston rod 36, and intermediate the ends on both sides by cylinder 32, connecting rod 31 and their duplicates.

The body 11 is supported at three additional points on the beam 26. (See also FIG. 3). The slide box 39 is mounted on the beam 26 by means of brackets 44 or other suitable means. The scissors member 48 is supported on the body structure by a support member 49, and the member 54 is supported on the beam 26 at the support pivot 55. This arrangement is better seen in FIG. 3 in which the other pair of scissors elements 58 and 64 are shown supported on the beam 26 by means of pivot 65 and on the body structure 11 by means of a support member 59. The body 11 is mounted on the carrier 61 by means of its internal frame structure (not shown). The carrier 61 includes the forward cross member 62 which carries on one end the scissors support 59 and on the other end the scissors support 49. The aft portion of the carrier 61 is supported on the slide 40 in the slide box 39. FIG. 3 shows a plan view of the carrier 61, the beam 26 and the supporting and operating members. FIG. 4 is an elevational view of the same equipment without the body portion 11.

Motion of the carrier 61 with respect to the beam 26 is controlled by a cylinder 67 which has a piston rod 68 associated with it, and a cylinder 72 which has a piston rod 73 associated with it. These mechanisms are also shown in FIGS. 3, 4, 5 and 6 to which reference should be made. The cylinder 67 is supported on the beam 26 by means of a pivot (or universal joint) 77, and its piston rod 68 has a bell crank 45 mounted on a pivot 76 at its outer end. The cylinder 67 is located near the forward end of the beam 26 and the support member 61. The cylinder 72 is mounted on a U-shaped frame 53 by means of a suitable support and is located near the aft end of the beam 26 and the carrier 61. Its piston rod 73 is connected to one end of a bell crank 51 which is carried on a support 74 by means of suitable pillow blocks and pivots 52. The other end of the bell crank 51 is connected to one end of a connecting rod 75, the other end of which is connected to the slide 40 in the slide box 39. The piston rod 68 is connected to the approximate center of the bell crank 45, and one end of the bell crank 45 is pivotally connected to a support 47 mounted on the beam 26, while its other end is pivotally connected to a tie rod 69 which passes between the beam 26 and the carrier 61 and is pivotally connected to the under side of the carrier 61. Thus, the combination of the cylinder 67, piston rod 68, bell crank 45, rod 69 and support 47 is that mechanism which is represented in FIG. 1 by the arrow 15. Similarly, the combination of the cylinder 72, piston rod 73, bell crank 51, support 74 and rod 75 is represented in FIG. 1 by the arrow 16.

The problem solved here was one of supporting the body 11, which would weigh in the order to five tons, while providing it with at least five degrees of motion in which the motion was achieved easily and smoothly under complete control. The platform upon which the body 11 was mounted was supported on three points, and the base for those three support points was further supported on three points. As explained in connection with FIG. 1, the beam 26 is moved in pitch, roll and elevation by the interoperation of the three cylinders 17, 18 and 19. However, to accomplish yaw and lateral movement, several approaches were studied. For yaw, the carrier 61 could be mounted at its rear end on a single pivot with the cross beam 62 mounted on slides movable in a track. However, there are several problems with this type of construction. The tracks must be sufficiently large to carry heavy loads and they are usually open. Open tracks tend to accumulate dirt, dust, grit and gravel which increases their wear and decreases the smoothness of operation. In addition, when the carrier 61 is required to move laterally, the track has to be linear. But when the carrier 61 is to yaw, the track has to be curved. This proved to be economically impractical. Another alternative construction was mounting the beam 26 upon a turntable which would provide the yaw, and mounting the body 11 upon a track to provide lateral movement. This apparatus proved to be very complex, heavy, and impractical, also.

The structure of this invention mounts the carrier 61 with its cross member 62 upon only three pivots: the vertical axis 41 mounted on the slide 40 at the rear of the carrier 61 and the two scissors pivots 56 and 66. In this manner, the supporting mechanism is kept simple and light. The bearing structures are sealed against dirt and will always maintain smooth operation. To produce the movements desired, only two cylinders 67 and 72 are required. The scissors arrangements at either end of the cross member 62 permit rotary and lateral movement within the desired limits while providing the necessary support at the same time.

Figure 5:
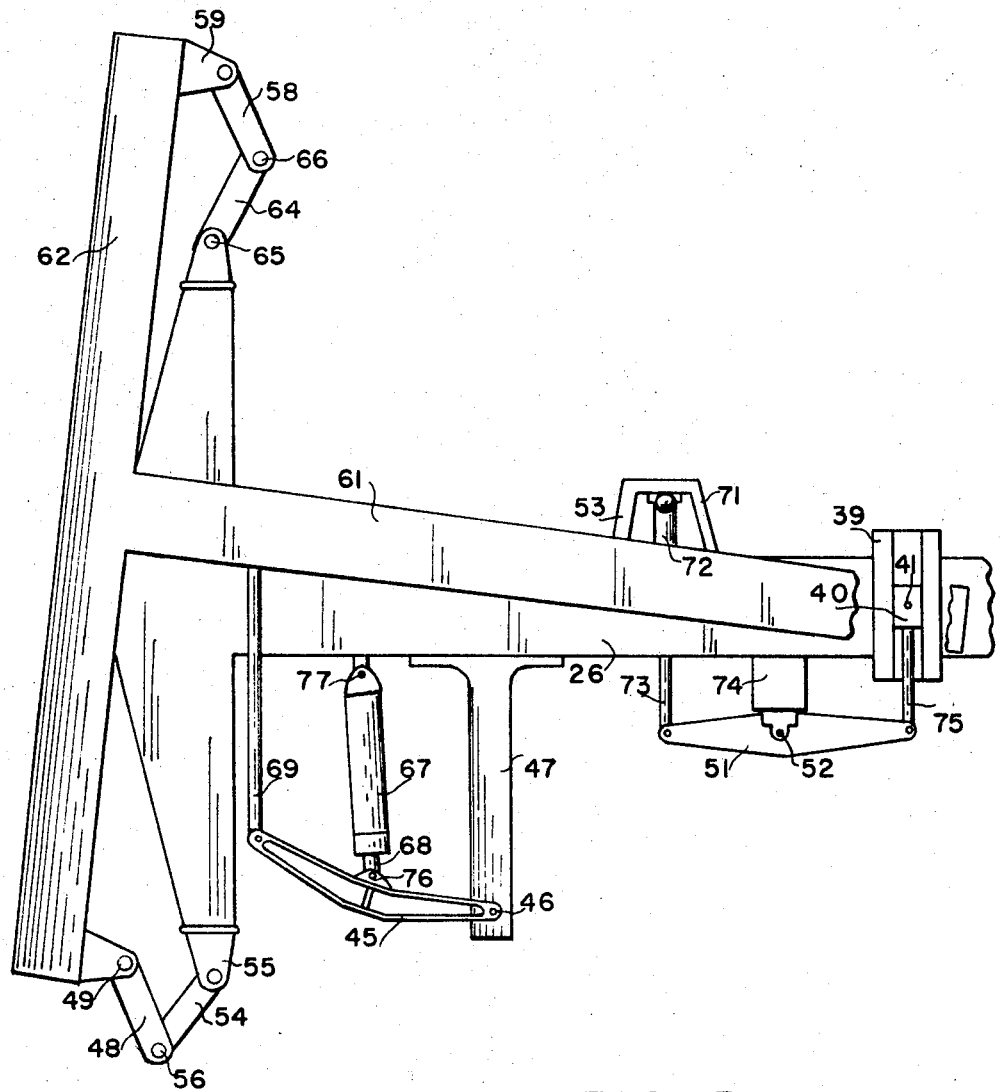
FIGS. 5 and 6 are plan views of the apparatus of FIG. 3 in two operated positions.

The operation of the mechanism illustrated in FIGS. 2, 3 and 4 can readily be explained by reference to FIGS. 5 and 6 in FIG. 5, the carrier 61 and its cross member 62 is shown yawed to the right about the vertical shaft 41. This operation is achieved by maintaining the slide 40 stationary and by operating the cylinder 67 to withdraw the piston rod 68 into the cylinder. This causes the bell crank 45 to rotate clockwise (as shown in FIG. 5) about the pivot 46 on the support 47 and to move the tie rod 69, causing the carrier 61 to move clockwise about the shaft 41. Since the pivot 76 connecting the piston rod 68 with the bell crank 45 is approximately centered on the bell crank 45, the effect is that of multiplying the lever arm, and the motion of the tie rod 69 is approximately double the movement of the piston rod 68. This arrangement of cylinder and bell crank, while not necessary in a device of this nature, serves to decrease the amount of space required for the cylinder and piston rod operation.

Figure 6:
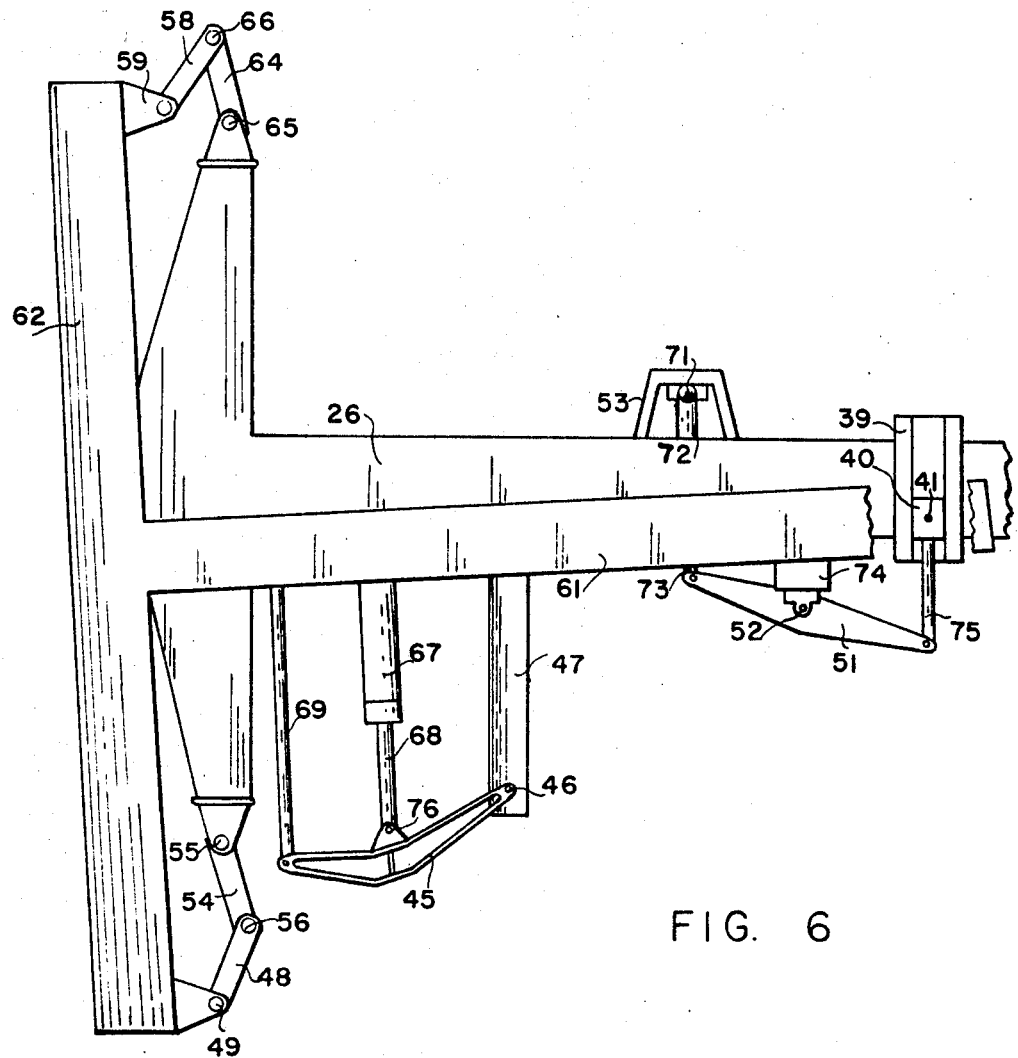

In FIG. 6, the carrier 61 with its cross member 62 is shown yawing counterclockwise or to the left. In this case, the cylinder 67 is actuated to expel a substantial portion of the piston rod 68. At the same time, the cylinder 72 is operated and the connecting rod 73 moves more deeply into the cylinder 72. Since the bell crank 51 is pivoted upon the pivot 52 approximately midway across its length, the bell crank 51 serves as a simple lever having the two lever arms approximately the same length. Thus, when the piston rod 73 is withdrawn into the cylinder 72, the bell crank 51 is pivoted on its pivot 52, and the slide 40 is moved to the left by means of the connecting rod 75. In the situation shown in FIG. 6, the entire carrier 61 is moved to the left with the forward portion being moved a greater amount than the rearward portion. Therefore, the carrier 61 yaws to the left but about a point which is located a substantial distance to its rear.

When both cylinders 67 and 72 are operated to move the carrier 61 in the same direction by the same amount, then the carrier 61, together with the body 11 and all that it carries, is moved laterally. This can be considered yawing, with a radius of yaw of infinite length. By varying the amounts by which each of the two cylinders 67 and 72 affect the movement, in either direction, of the carrier 61, the radius of the arc described by the cross member 62 may be caused to vary from an infinite radius to that less than to the length of the carrier 61. A yawing affect having a radius which is less than the length of the carrier 61 can be acheived by causing the rear of the carrier 61 to move in one direction while its forward portion moves in the opposite direction. The scissors arrangement which supports the two ends of the cross member 62 also supplies means for permitting the cross member 62 to move, within the desired limits of travel, over a tortuous path which is limited only by the lengths of parts involved. The entire arrangement is rugged, simple in its construction and inexpensive in its maintenence.

The above specification has described a new and improved mechanical motion system for moving heavy loads in a prescribed and controlled manner. The invention has been described in connection with a motion system for simulating the movements of vehicles which are used for training, but this motion system is suitable for supporting any platform which requires several degrees of freedom under controlled conditions. It is realized that the above description may indicate to those in the art additional ways in which the principles of this invention may be used without departing from its spirit. It is, therefore, intended that this invention be limited only by the scope of the appended claims.

What is claimed is:

1. Apparatus for supporting and moving a student station of a motion simulator in a lateral direction and in a rotary direction within limits, said apparatus comprising:
    (a) a carrier upon which said student station is mounted;
    (b) an elongated extension positioned laterally across one end of said carrier;
    (c) first means for pivotally supporting the other end of said carrier;
    (d) a beam; and
    (e) second means connected to each end of said elongated extension for pivotally supporting said carrier on said beam to permit the swinging of the ends of said extension through an arc and also to permit lateral movement, each of said second means comprising:
        (1) a first arm;
        (2) means for pivotally connecting one end of said first arm to one end of said extension;
        (3) a second arm;
        (4) means for pivotally connecting one end of said second arm to said beam; and
        (5) means for pivotally connecting together the other ends of said first and second arms.

2. The apparatus defined in claim 1 wherein each of said means for pivotally connecting together the other ends of said first and second arms also comprises a support for said carrier whereby said carrier is pivotally supported at three points, two of which support points are free to swing in variable arcs.

3. The apparatus defined in claim 2 further including a support for said first means, said first means support including a slide box, and a slide mounted in said slide box for linear movement therein and attached to said first means, whereby said first means which pivotally supports one end of said carrier is capable of linear movement.

4. The apparatus defined in claim 3 further including means for mounting said slide box on said base so that the direction of linear movement of said slide is laterally of said carrier.

5. The apparatus defined in claim 2 further including first force means mounted adjacent the other end of said carrier for providing said carrier with a laterally applied force to cause said other end of said carrier to be laterally displaced.

6. The apparatus defined in claim 3 further including second force means mounted adjacent said one end of said carrier for applying to said carrier at a point adjacent said one end a force to cause said one end of said carrier to move laterally.

7. The apparatus defined in claim 5 further including second force means for applying to said one end of said carrier a force for causing said one end of said carrier to move laterally.

8. The apparatus defined in claim 7 wherein said first and second force means are separately and individually controlled to cause the two ends of said carrier to move separately and independently of each other.

9. A motion system for supporting and moving a student station in vehicle training apparatus, said system comprising, in combination:
(a) a first rigid member upon which said student station is fixedly mounted;
(b) a second rigid member;
(c) first means for mounting said first member upon said second member for movement relative thereto along a first axis and about a second axis perpendicular to said first axis;
(d) second means for mounting said second member for movement relative to a fixed base about said first axis, along said second axis, and about a third axis mutually perpendicular to both said first and second axes, and
(e) a plurality of motive means constructed and arranged to impart said movements to each of said first and second members.

10. The invention according to claim 9 wherein said first means includes structure stabilizing said first member against movement about said first and along said second axis.

11. The invention according to claim 9 wherein said second means includes structure stabilizing said second member against movement along said first and about said second axis.

12. The invention according to claim 9 wherein said plurality of motive means for imparting movement to said first member are mechanically connected to move said first member along said first axis when operated in the same direction by the same amount, and about said second axis when operated in the same direction by different amounts and when operated in different directions.

13. The invention according to claim 12 wherein said plurality of motive means for imparting motion to said first member include a pair of extensible actuators connected between said first and second members at two spaced points on each.

14. The invention according to claim 11 wherein said first member is supported at three points relative to said second member.

15. The invention according to claim 13 wherein said pair of extensible actuators provide independent yaw and lateral translation motion for said student station.

16. The invention according to claim 12 wherein said plurality of motive means for imparting movement to said second member include three extensible actuators connected between said fixed base and said second member to support the latter at three spaced points.

17. The invention according to claim 16 wherein said three extensible actuators provide independent pitch, roll and vertical translation motion for said student station.

References Cited

UNITED STATES PATENTS 3,281,962  11/1966  Pancoe _____ 35—12
3,295,224  1/1967   Cappel _____ 35—12

EUGENE R. CAPOZIO, *Primary Examiner.*

PAUL V. WILLIAMS, *Assistant Examiner.*